(12) United States Patent
Rozzi et al.

(10) Patent No.: US 8,233,705 B2
(45) Date of Patent: Jul. 31, 2012

(54) POTENTIAL FIELD-BASED GAMUT MAPPING

(75) Inventors: William A. Rozzi, Stillwater, MN (US); Hahn Chung, Minnetonka, MN (US); Timothy A. Fischer, Mendota Heights, MN (US)

(73) Assignee: Eastman Kodak Company, Rochester, NY (US)

( * ) Notice: Subject to any disclaimer, the term of this patent is extended or adjusted under 35 U.S.C. 154(b) by 971 days.

(21) Appl. No.: 12/244,813

(22) Filed: Oct. 3, 2008

(65) Prior Publication Data

US 2010/0086226 A1    Apr. 8, 2010

(51) Int. Cl.
G06K 9/00 (2006.01)
G09G 5/02 (2006.01)
(52) U.S. Cl. ........................ 382/162; 345/590
(58) Field of Classification Search .................. None
See application file for complete search history.

(56) References Cited

U.S. PATENT DOCUMENTS

| | | | |
|---|---|---|---|
| 5,721,572 A | 2/1998 | Wan et al. | |
| 5,881,211 A | 3/1999 | Matsumura | |
| 6,573,889 B1 | 6/2003 | Georgiev | |
| 6,734,851 B2 | 5/2004 | Georgiev | |
| 6,867,883 B1 | 3/2005 | Cholewo et al. | |
| 6,995,865 B1 | 2/2006 | Motomura | |
| 7,333,237 B2 | 2/2008 | Ogatsu et al. | |
| 7,583,406 B2 * | 9/2009 | Spaulding et al. | 358/1.9 |

FOREIGN PATENT DOCUMENTS

| | | |
|---|---|---|
| EP | 0 501 942 A1 | 9/1992 |
| WO | WO 2007/024494 A1 | 3/2007 |

OTHER PUBLICATIONS

Kyuseo Han; Byoung-Ho Kang; Maeng-Sub Cho;"Simultaneous gamut compression with extended line of cusps", TENCON 1999. Proceedings of the IEEE Region 10 Conference.*

Maarten van Gestel et al.: "Color Gamut Mapping along Electrostatic Field Lines", NIP17: International Conference on Digital Printing Technologies, XX, XX, Sep. 30, 2001, pp. 801-803, XP-002407369.

International Color Consortium; Image technology colour management—Architecture, profile format, and data structure; Specification ICC.1:2004-10.

Holm et al.; ICC Votable Proposal Submission Perceptual Intent Reference Medium Color Gamut; Feb. 22, 2005.

(Continued)

*Primary Examiner* — Li Liu
(74) *Attorney, Agent, or Firm* — Nelson Adrian Blish

(57) ABSTRACT

A method for adjusting a color in a color space comprises adjusting the color along a gradient path to a point in or on a color gamut. The gradient path is determined from a potential field derived from the color gamut consisting of gamut points in the color space. The potential field can be derived from one or more points in the color gamut and different functions may be used to determine the potentials due to different points in the gamut. The potential at a point in the color space due to the gamut point can be a function, including an inverse power, of distance of the point in the color space from the gamut point. The gradient path can be determined from the gradient of the potential field by quadric error-based surface simplification of a surface mesh representing a surface of the gamut.

9 Claims, 4 Drawing Sheets

OTHER PUBLICATIONS

J. Morovic; Public Gamut Mapping Algorithm (PGMA) C Source Code, http://www.colour.org/tc8-03/pgma.html, 2001.
Garland et al.; Surface Simplification Using Quadric Error Metrics, 1997.
Werner et al.; Exterior Gravitation of a Polyhedron Derived and Compared with Harmonic and Mascon Gravitation Representations of Asteroid 4769 Castalia; Celestial Mechanics and Dynamical Astronomy 65: 1997, pp. 313-344.

* cited by examiner

POTENTIAL FIELD-BASED GAMUT MAPPING

FIELD OF THE INVENTION

This invention relates to gamut mapping when performing cross-device and cross-media image reproduction where the source and destination device gamuts differ.

BACKGROUND OF THE INVENTION

A typical digital imaging system may include an image capture device such as a digital camera or scanner, a computer attached to the digital camera for processing the digital images, and a color output device such as a printer or softcopy display attached to the computer for printing/viewing the processed digital images. A color management architecture for a digital imaging system provides a means for processing the digital images in the computer such that the output colors that are produced on the output device are reasonable reproductions of the desired input colors as captured by the input device.

One such color management architecture that is widely known and accepted in the art is defined by the International Color Consortium (ICC) in Specification ICC.1:2004-10 "Image technology colour management—Architecture, profile format, and data structure." The ICC color management framework provides for characterizing an imaging device using a device profile such as an "ICC profile." The ICC profile for an imaging device specifies how to convert to/from device dependent color space (DDCS) and from/to a device independent color space (DICS) so that images may be communicated from one device to another.

The ICC profile format, of course, simply provides a file format in which a color transform is stored. The color transform itself, which is typically encoded as a multidimensional look-up table, is what specifies the mathematical conversion from one color space to another. There are many tools known in the art for creating ICC profiles for a wide variety of imaging devices, including inkjet printers using CMYK colorants.

The device color gamut, in the DICS, defines the range of DICS values that are reproducible by the color imaging device. Color imaging devices with larger DICS gamuts are capable of producing a wider range of DICS values than devices with smaller DICS gamuts. The ICC color profile specification defines the range of all DICS values that may be represented in an output color profile. This range of DICS values is larger than the color gamut boundary of typical color imaging devices. As such, the regions of the DICS that are outside of the color gamut boundary of the color imaging device need to be mapped into the color gamut boundary of the output color imaging device. This process is commonly referred to in the art as color gamut mapping.

In order to perform a color gamut mapping operation in a DICS, a representation of the color imaging device's color gamut boundary is necessary. U.S. Pat. No. 5,721,572 teaches a process of generating a gamut surface descriptor (also referred to herein as a color gamut boundary) that consists of color gamut boundary points and a set of a set of triangular facets. A collection of points and triangular facets with vertices comprised of three of said points is known as a triangle mesh. One such DICS color gamut boundary 200 is shown in FIG. 1. Thus, DICS values that fall inside of this color gamut boundary are capable of being created by the output color imaging device, and DICS values that fall outside of this color gamut boundary are not capable of being created by the output color imaging device. The color gamut descriptor described by U.S. Pat. No. 5,721,572 defines the complete color gamut boundary for a three or four colorant color imaging device. In a similar fashion, a complete color gamut boundary may be computed for imaging devices having even greater numbers of colorants. The complete color gamut boundary is defined as one that encompasses all combinations of the colorants used by the output color imaging device. Thus, the complete color gamut boundary defines all possible DICS values producible by the device.

Since output color profiles are designed to accept as inputs DICS values over a larger range of values than are capable of being reproduced by the output color imaging device, a gamut mapping process is required. Many such gamut mapping processes are known in the art. One common color gamut mapping process is gamut clipping. This process involves taking an out-of-gamut DICS value and mapping it to the surface of the color imaging device gamut. Using this type of approach, all out-of-gamut DICS values will get reproduced using the DDCS values of combinations of points defined in the color gamut boundary.

As regards specific gamut mapping algorithms (GMAs), some GMAs can produce undesirable artifacts such as loss of image detail or large transitions in the mapped image. One of the simplest GMAs, minimum distance gamut mapping, can exhibit both of these artifacts. Minimum distance gamut mapping replaces an out-of-gamut color with the closest color on the surface of the destination gamut, in terms of some arbitrary distance measure. For examples of how minimum distance mapping produces these artifacts, consider the properties of a minimum Euclidean distance mapping in the presence of cusps and concave spherical patches. At a cusp, all points outside the gamut equidistant from the cusp will be mapped to the cusp, leading to a loss of detail. In the case of a concave spherical patch, relatively close points situated near the center of the ball on which the patch lies may be mapped to widely-separated points on the patch, producing a discontinuity in the mapping and in subsequent image separations.

Therefore, there remains a need for a gamut mapping algorithm that addresses the problems surrounding the shortcomings that plague existing gamut mapping techniques.

SUMMARY OF THE INVENTION

The present invention is a method for adjusting a color in a color space. The adjusting is along a gradient path determined from a potential field and the potential field is derived from a color gamut consisting of gamut points in the color space. The potential field is derived from a potential due to at least one gamut point. The potential at a point in the color space due to the gamut point can be a function of distance of the point in the color space from the gamut point. The potential at a point in the color space due to the gamut point can be proportional to an inverse of a power of distance of the point in the color space from the gamut point, and, in particular, it can be proportional to the inverse of the square of distance of the point in the color space from the gamut point. The gradient path is determined from the gradient of the potential field and, in particular, the gradient path can follow the gradient. The gradient can be determined by quadric error-based surface simplification of a surface mesh representing a surface of the gamut. The adjusting of the color can be to a position on the surface of the color gamut or it can be to a position inside the color gamut.

The potential field can be derived from potentials due to at least a first gamut point and a second gamut point, wherein a first function is used to calculate the potential at a point in the color space due to the first gamut point and a second function is used to calculate the potential at the point in the color space due to the second gamut point, and the second function is different from the first function. The second function can differ from the first function by a multiplicative constant.

In one embodiment of the present invention, the potential field is derived from the surface of the gamut. In another embodiment of the present invention the potential field is derived by combining potential fields due to the gamut and potential fields due to attractors or repellers or both in the color space.

The present invention is a method for adjusting a color in a color space, wherein the color space comprises a color gamut. The adjusting comprises providing a target device independent color space color to be mapped into the color gamut, a current position in the color space, a last position in the color space and a fine triangle mesh on the surface of the color gamut. The method farther comprises setting the current position equal to a target color; setting the last position equal to the current position; computing the normalized potential gradient at the current position; updating the current position based on weighted gradient components; forming a line segment between the last position and the current position; determining whether the line segment intersects the fine triangle mesh and, if the line segment does not intersect the fine triangle mesh, then repeating the steps until the resulting line segment intersects the fine triangle mesh. The method further comprises finding the intersection point of the line segment with the fine triangle mesh and identifying the intersection point as a mapped device independent color space color. Optionally, the method of the present invention comprises computing the corresponding device dependent color space at the intersection point.

One useful application of the method of the invention is in adjusting out-of-gamut colors in a device color space to positions at least on the surface of the gamut of the device.

DETAILED DESCRIPTION OF THE INVENTION

Figure 1:
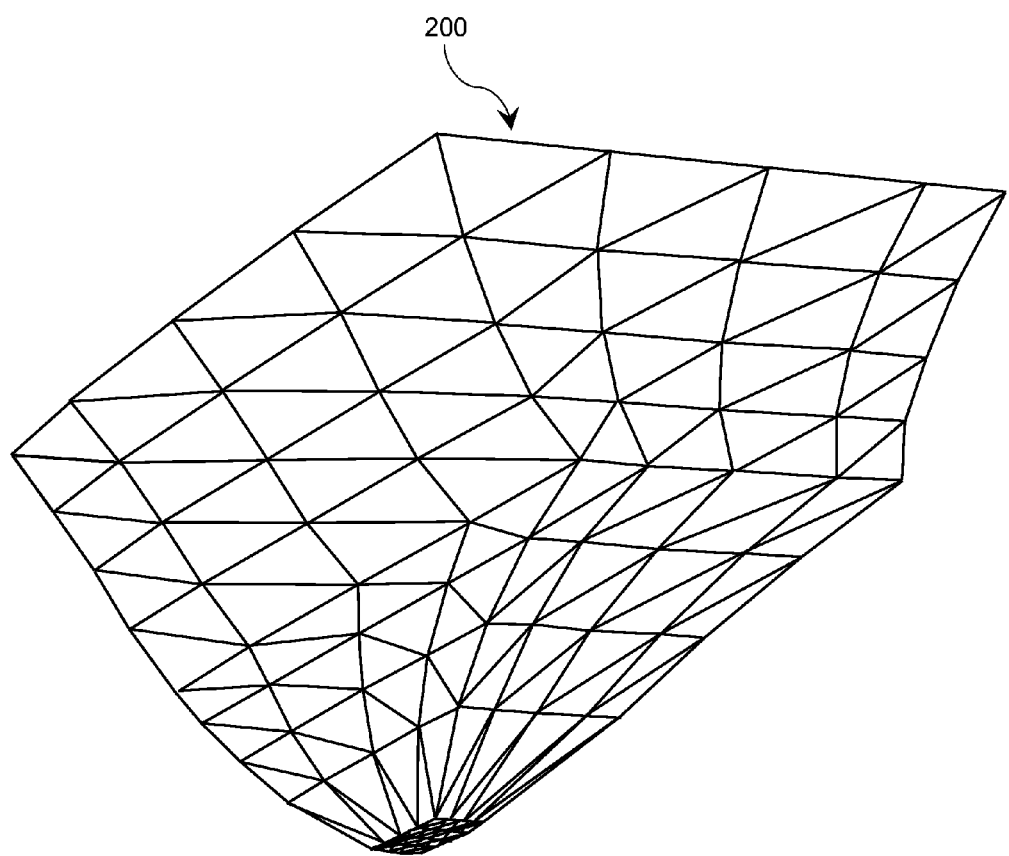
FIG. 1 is a diagram illustrating an exemplary triangle mesh representation of a color gamut boundary.

Throughout the following description specific details are presented to provide a more thorough understanding to persons skilled in the art. However, well-known elements may not have been shown or described in detail to avoid unnecessarily obscuring the disclosure. Accordingly, the description is to be regarded in an illustrative, rather than a restrictive, sense.

For the purposes of the current invention, the term CIELAB refers to the prior art device independent color space (DICS) defined by the Commission Internationale De L'Eclairage (CIE). Those skilled in the art will recognize that the CIELAB color space is widely used in the fields of digital imaging and color gamut mapping. The use of the CIELAB color space throughout this document is meant to serve as an example device independent color space. However, many other well known device independent color spaces could be substituted for CIELAB.

The present invention is a method for adjusting a color in a color space. The adjusting is along a path determined from a potential field derived from a color gamut in the color space. The gamut is treated as a solid composed of a potential-inducing substance in the color space. As is the case with mass and gravity in real space, the gamut can be arbitrarily shaped, possess arbitrary density distribution, and is taken to induce a net potential field in the surrounding color space as a result of the combined potentials induced by all infinitesimal elements of the gamut. Colors in the color space are adjusted by adjusting them along the gradient of the resulting potential. In the present specification the term "gradient path" is used to describe a path obtained by starting at an arbitrary point in the color space and following the gradient of the potential from that point in the direction of both decreasing and increasing potential. In this respect, it is analogous to the path followed by a near-massless particle as it moves along the gradient of a gravitational potential in real space. This is, of course, analogous to the gravitational force field lines in the case of gravity in real space. As with gravity in real space, the potential field is well-behaved and single valued and its color-spatial gradient similarly well-behaved and single valued at all points. Therefore there exists only one unique point at which the gradient path intersects the surface of the color gamut and the gradient paths never intersect one another.

One useful application of the method of the present invention is in adjusting out-of-gamut colors in a device color space to positions at least on the surface of the gamut of the device. In the most simple example, the color of interest (analogous to a particle of mass in real space) is adjusted in the direction of the gamut along the totally unique gradient path that intersects its unadjusted position in color space to a point where the gradient intersects the surface of the gamut. Since the potential field is mathematically well-behaved and single valued, and its color-spatial gradient similarly well-behaved and single valued at all points, there exists only one unique point at which the gradient path intersects the surface of the device gamut and the gradient paths never intersect one another.

This gamut mapping algorithm therefore does not suffer from the shortcomings of other algorithms, which are plagued by multiple in-gamut solutions or by large numbers of distinctly different out-of-gamut colors ending up at the same point on the gamut. Potential-based gamut mapping can also map distinctly different out-of-gamut colors to the same point on the gamut, but it does so for many fewer points. All points on a gradient path map to the same point on the gamut, but, since these points only lie on a curve, they are far fewer than the number of points that would be mapped to the same point in a minimum-distance mapping. In this latter case, the very large number of points within a 3-dimensional sub-volume maybe mapped to a single gamut point.

Considering, by way of example, the CIELAB device independent color space, one can allow for the unequal weighting of lightness, chroma, and hue in the context of the "potential-based gamut mapping" of the present invention, by adding potential inducers (attractors or repellers) to the otherwise uniform-density gamut, and/or computationally weight the various components of the potential gradient. For example, to preserve lightness, the L* component of the gradient may be weighted by factors less than 1.0 to reduce the magnitude of steps in that direction. Adding attractors along the neutral (L*) axis provides more emphasis on hue preservation.

In the present specification, the term primary is used to refer to the color of single device colorants. In the present specification, the term secondary is used to refer to the color of combinations of pairs of primaries. For example, for a CMYK device, the primaries are cyan, magenta, yellow, and black, while the secondaries include blue, red, and green as combinations of cyan and magenta, magenta and yellow, and yellow and cyan, respectively.

To preserve or add emphasis to specific colors, such as primaries and secondaries for use in a saturation mapping, additional attractors may be placed at the CIELAB locations of these colors. Since attractor and repeller contributions to both the potential and gradient are additive, inclusion of the effects of these supplemental attractors and repellers is straightforward. Note that the mapping need not be just from out of gamut points to the surface; one may also map out-of-gamut colors to any point along a trajectory, either on or inside the destination gamut. This may be used to define a perceptual mapping between a device and the ICC V4 perceptual intent reference medium gamut (PRMG). Saturation and perceptual rendering intents are described in the aforementioned ICC.1:2004-10 specification, while the PRMG is described in ICC Votable Proposal Submission Perceptual Intent Reference Medium Color Gamut, by Holm et al., Feb. 22, 2005.

In one embodiment of the present invention, the potential at any point in the color space is calculated by integrating or summing the contribution of each infinitesimal element of the gamut. In a most general case, the contribution of a first point within the gamut has a contribution to the potential field that is described by a first function of position in color space, while the contribution of an arbitrary second point in the gamut can be a second function, the second function being different from the first function.

In one embodiment of the present invention, the contribution of all points within the gamut is described by the same function, but different points in the gamut weigh the function with a multiplicative function that varies from point to point. In this respect, the multiplicative function is analogous to density in the case of gravitational theory.

Figure 2:
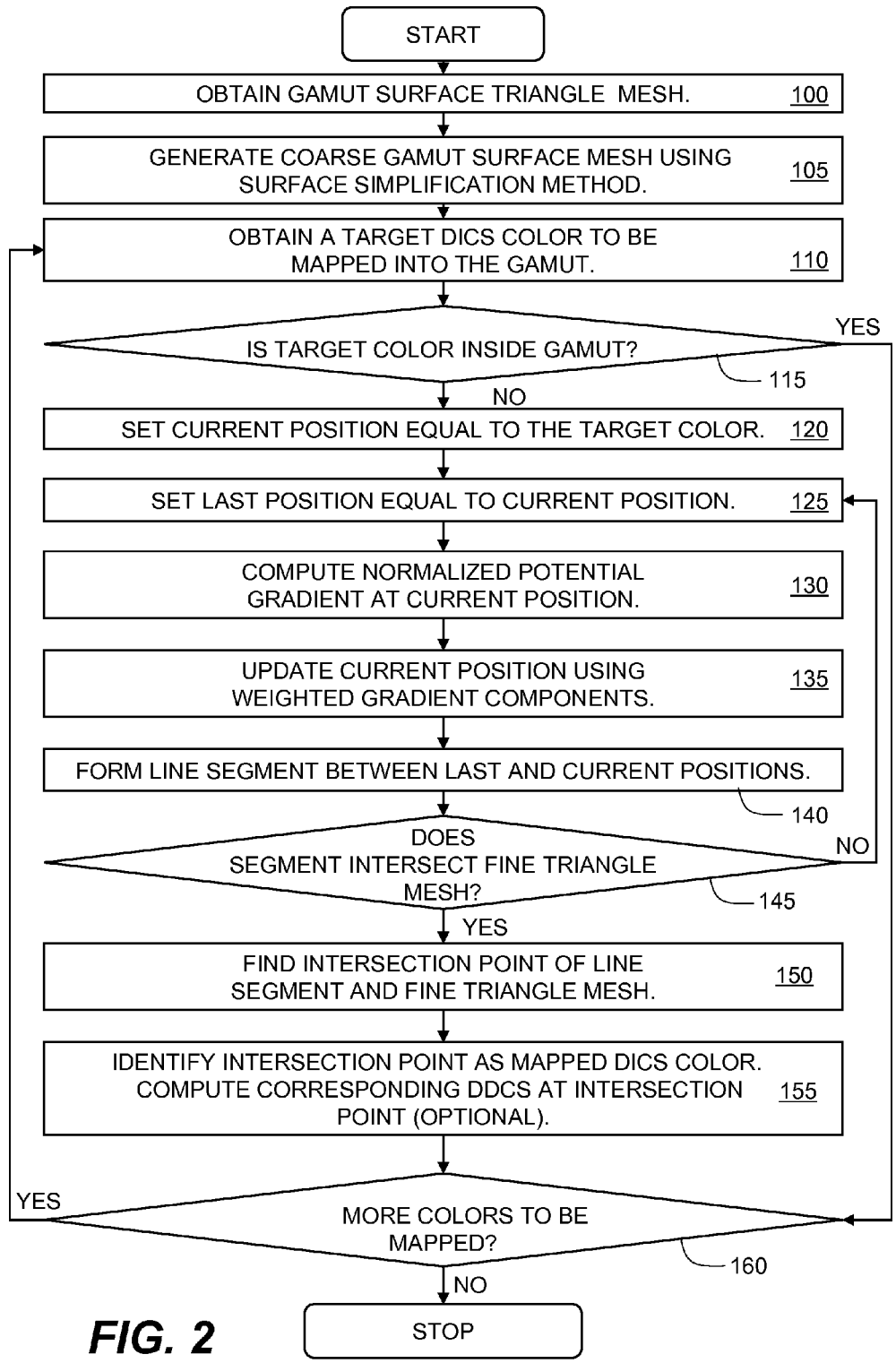
FIG. 2 is a flowchart illustrating a method of performing gamut mapping based on tracing a gradient path in a potential field.

In one embodiment of the present invention, implementation of the gravitational gamut mapping method is as outlined in FIG. 2, beginning with obtaining a triangle mesh representation of the gamut boundary 100. Determination of a gamut boundary is a well-known procedure. See, for example, the 3-dimensional gamut viewer in the ColorSync Utility, a standard application within Apple Computer's Macintosh OS X operating system. Furthermore, source code for gamut boundary calculation is available as part of Morovic J. (2001), Public Gamut Mapping Algorithm (PGMA) C Source Code. The provided triangle mesh is referred to hereafter as the fine mesh.

Computation of the potential gradient associated with a closed triangle mesh, as described below, is linear in the number of triangles. For fine meshes with many triangles, potential gradient computation may require extensive computational resources. An alternative in such cases is to use a simplified surface mesh for the potential gradient calculation and the fine mesh for determining surface intersection. Therefore, a coarse triangle mesh representation is generated from the fine mesh using a surface simplification algorithm 105. One well-known simplification algorithm is the quadric error-based surface simplification method described in Michael Garland and Paul S. Heckbert, *Surface Simplification Using Quadric Error Metrics*, the entire content of which is incorporated herein by reference. A coarse mesh around 80 triangles is a sufficient approximation of the fine mesh for use in potential gradient calculations. Coarse meshes with near this number of triangles, combined with an single instruction multiple data (SIMD) implementation of key portions of the potential gradient calculation, results in computation speeds suitable for commercial use. Applications that do not require fast gamut mapping may skip the surface simplification process and perform potential gradient calculations using the fine mesh. Similarly, applications that do not require high precision results may perform all calculations with a coarse mesh.

Once the triangle meshes are prepared, one or more target DICS colors (hereafter simply target colors) may be gamut mapped. The mapping procedure begins by obtaining a target color 110. The fine mesh is queried to determine whether the target color is contained within the fine mesh 115. If the target color is inside the gamut surface, one may choose to skip the gamut mapping procedure and check whether additional colors await mapping 160.

If the target color is not inside the fine mesh, then a current position variable p (with bold text indicating vectors or other multidimensional quantities) is set equal to the target color 120 in preparation for entering a gradient path-tracing loop. Since the target represents a point in a device independent color space, one may equate the terms position and color in the context this description of the gamut mapping process. The loop begins by setting a last position variable q equal to the current position p 125. This is followed by computation of the normalized potential gradient at the current position 130. Details of this computation are given below.

Next, the current position is updated using the normalized potential gradient 135. The normalized potential gradient d indicates the direction of motion of the current position during path tracing. If desired, however, anisotropic, position-dependent weights w(p) may be applied to the normalized potential gradient components to improve the visual qualities of gamut-mapped images. Example weighting schemes include: (a) all weights equal to a constant c throughout all of color space; this effectively applies a constant scale factor to the potential gradient, (b) unequal but fixed weights, that may be used, for example, to preserve lightness between the target and mapped colors, (c) weights that vary with lightness (L*) only, to map darker colors differently than lighter colors, (d) weights that vary with chroma (C*) only, to map less saturated colors differently than more saturated colors, and (e) weights as a general function of position, to obtain a combination of effects resulting in a more preferred mapping.

After application of the weights, the update vector is multiplied by a step size parameter s. Finally, the update vector is subtracted from the current position to obtain the updated position p'. Symbolically, the position update equation is $$p'_i = p_i - s w_i(p) d_i,$$

where the index i indicates the L*, a*, or b* spatial component of the various positions, vectors, and weights.

A line segment data structure is formed using the current position p and last position q as its endpoints 140. This line segment is tested for intersection against the fine triangle mesh 145. Intersection tests between line segments and triangle meshes are well known, particularly in the area of computer graphics. Various acceleration techniques, such as use of space-partitioning data structures like octrees or kd-trees, may be applied to reduce the computational cost of line segment/triangle mesh intersection queries. These search structures divide space into two or more disjoint subsets, and associate triangles that are contained within or overlap each subset with the subset. If a line segment has no points in common with a subset, then intersection tests with all the triangles associated with the subset may be skipped. If a line segment overlaps a subset, then all of the subset's associated triangles are checked for intersection with the line segment. If the line segment does not intersect any triangles in the fine mesh, then the gradient path tracing loop repeats.

If the line segment does intersect the fine mesh, then the intersection point is determined 150. This point is identified as the gamut mapped DICS color 155. In applications such as construction of ICC profiles it is advantageous to determine DDCS values that correspond to the intersection point. If vertices of the triangle mesh are made to store their DDCS values, then DDCS values of the intersection point may be interpolated from the triangle vertex position, the intersection point, and the vertex DDCS values using standard techniques. For example, the intersection point's barycentric coordinates provides weights that may be used to combine triangle vertex DDCS values to obtain those of the intersection point. The mapped DICS color is stored or returned, as are the optional DDCS values for the mapped color. If additional target colors remain to be gamut mapped, the process repeats; otherwise it terminates 160.

Figure 3:
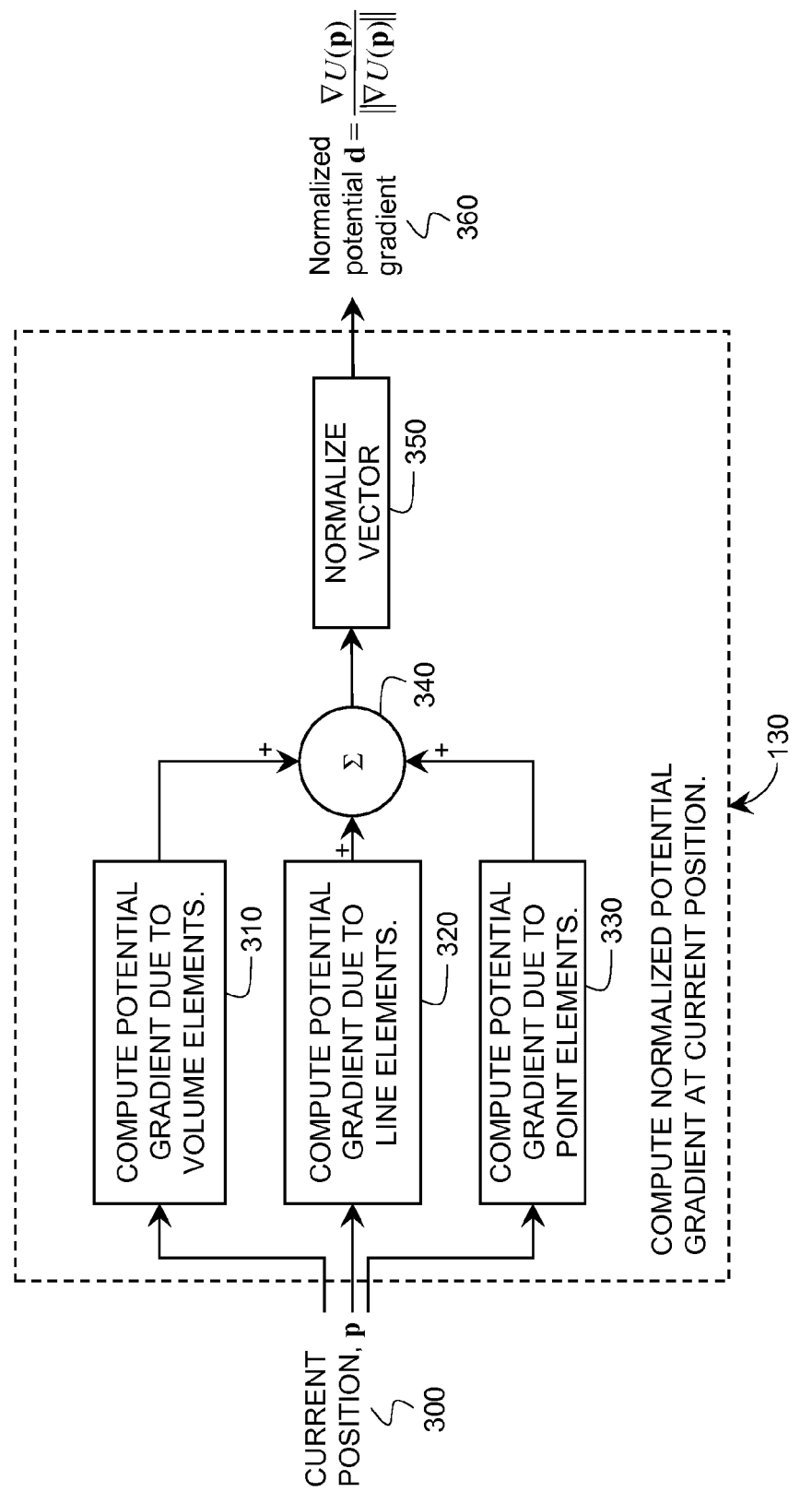
FIG. 3 is a block diagram illustrating a method of computing a normalized potential field gradient.

Calculation of the normalized potential gradient 130 is depicted in FIG. 3. At the current position p 300, contributions to the potential gradient from attractor or repeller solid elements 310, line elements 320, and point elements 330 are computed and summed 340 to obtain the potential gradient. If the potential at p is U(p), then $$U(p) = \sum_{i=1}^{N_s} U_{s,i}(p) + \sum_{j=1}^{N_l} U_{l,j}(p) + \sum_{k=1}^{N_p} U_{p,k}(p),$$

where $U_{s,i}(p)$ is the potential due to the $i^{th}$ solid element, $U_{l,j}(p)$ is the potential due to the $j^{th}$ line element, $U_{p,k}(p)$ is the potential due to the $k^{th}$ point element, and $N_s$, $N_l$, and $N_p$ are the number of solid, line, and point elements, respectively. The potential gradient is therefore $$\nabla U(p) = \sum_{i=1}^{N_s} \nabla U_{s,i}(p) + \sum_{j=1}^{N_l} \nabla U_{l,j}(p) + \sum_{k=1}^{N_p} \nabla U_{p,k}(p)$$

$$= \left[ \frac{\partial U(p)}{\partial L^*} \quad \frac{\partial U(p)}{\partial a^*} \quad \frac{\partial U(p)}{\partial b^*} \right].$$

The normalized potential gradient d 360 is obtained by dividing this last expression by $\|\nabla U(p)\|$, the vector norm of $\nabla U(p)$, i.e., $d=\nabla U(p)/\|\nabla U(p)\|$.

As an example of the computation of the potential gradient due to a solid element, consider the case of gravitational potential generated by a uniform density volume bounded by a gamut's surface mesh. The potential gradient for the gamut can be determined from the boundary mesh using calculations derived in Robert A. Werner and Daniel J. Scheeres, *Exterior Gravitation of a Polyhedron Derived and Compared with Harmonic and Mascon Gravitation Representations of Asteroid* 4769 *Castalia*, Celestial Mechanics and Dynamical Astronomy 65: 1997, pp. 313-344, hereafter W&S, the entire content of which is incorporated herein by reference. In particular, W&S Equation (10) indicates the computation required for $U_s(p)$, and W&S Equation (15) indicates a direct computation for $\nabla U_s(p)$ for a given polyhedral solid. Based on the derivations in W&S, it is possible to express both $U_s(p)$ and $\nabla U_s(p)$ as sums of per-triangle quantities. These per-triangle summations may be slower than W&S Equations (10) and (15) because they do not take advantage of canceling terms. They can be much easier to implement in code, however, and are particularly convenient for application with gamut boundary meshes represented as individual triangles.

Extending the gravitational potential example to line and point elements, W&S Equation (7) gives the expression for the potential of a straight wire, or line element. This expression may be multiplied by a constant $m_l$ to adjust the mass of the line element. Straightforward calculations or numerical approximations may be used to obtain a line element's contribution to the potential gradient. For a point element of mass m at location $x_p$, the potential is $U_p(p)=-m/\|p-x_p\|$ and the potential gradient is $$\nabla U_p(p) = \frac{-m(p - x_p)}{\|p - x_p\|^3}.$$

For any type of potential inducing element, whether it is a solid, line, or point element, the sign of its contribution to the summations for the total potential or potential gradient should be such that there is motion toward attractor elements and motion away from repeller elements. The equations above are written for attractor elements and have positive signs; to be consistent, repeller elements would use negative signs in these equations.

Figure 4:
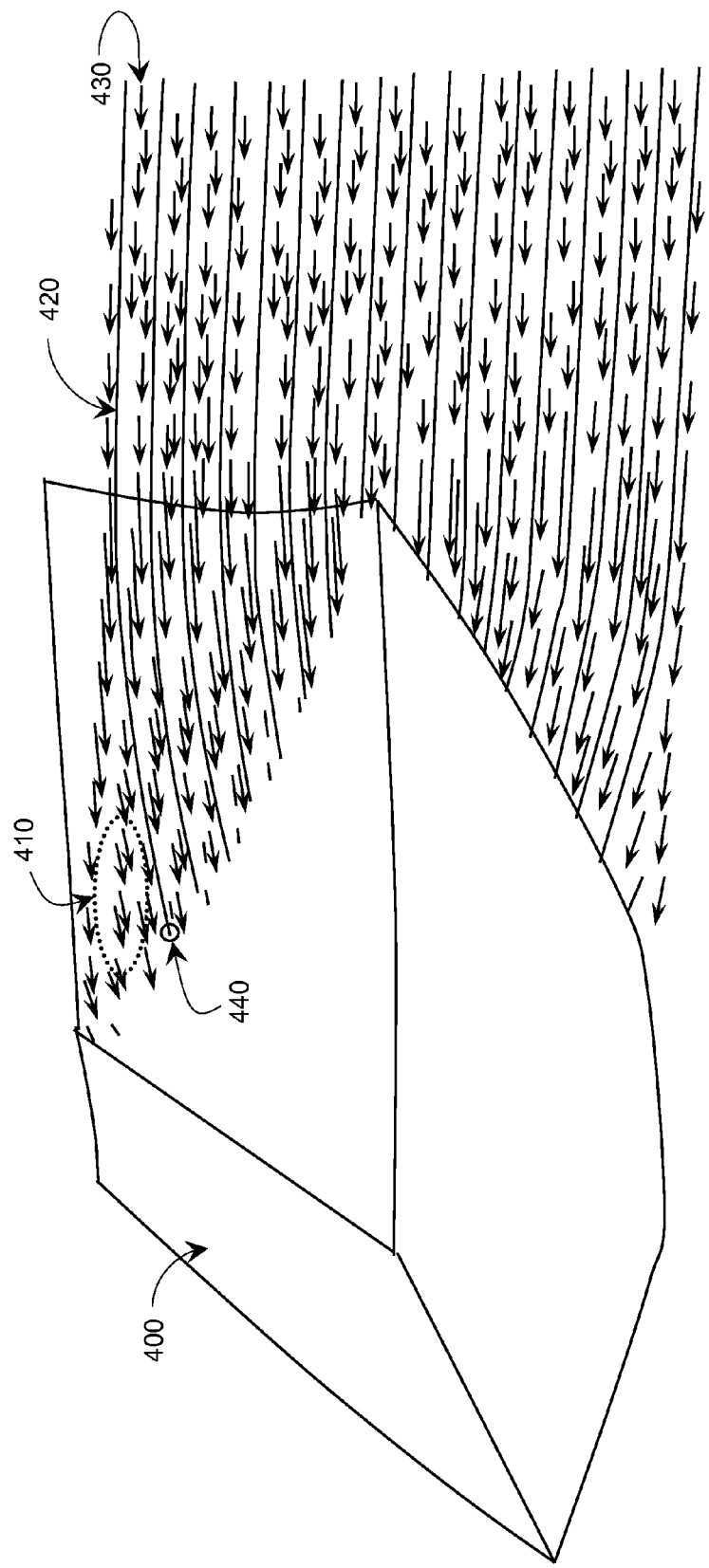
FIG. 4 is a diagram illustrating exemplary gradient vectors and gradient paths computed from a potential field induced by an exemplary color gamut.

FIG. 4 is a diagram illustrating exemplary potential gradient vectors 410 and gradient paths 420 computed from a potential field induced by an exemplary color gamut 400. Starting at an out-of-gamut target color 430, the gradient path is traced using the procedures described above until the path intersects the color gamut 400 surface. The intersection point 440 is identified as the mapped color for the out-of-gamut target color 430.

In yet another embodiment, gradient path tracing may not be terminated after intersecting the gamut surface, but rather tracing may be continued into the interior of the gamut. This enables gamut mapping methods that transform target colors to mapped colors strictly inside as well as on the boundary of the gamut, where both the target and mapped colors lie on the same gradient path.

The invention has been described in detail with particular reference to certain preferred embodiments thereof, but it will be understood that variations and modifications can be effected within the scope of the invention.

PARTS LIST 100 obtain gamut surface triangle mesh
105 generate coarse gamut surface mesh using surface simplification method
110 obtain target DICS color to be mapped into gamut
115 is target color inside gamut
120 set current position equal to target color
125 set last position equal to current position
130 compute normalized potential gradient at current position
135 update current position using weighted gradient components
140 form line segment between last and current positions
145 does segment intersect fine triangle mesh
150 find intersection point of line segment and fine triangle mesh
160 more colors to be mapped
200 exemplary triangle mesh (color gamut boundary)
200 position p
310 attractor or repeller solid element

320 line element
330 point element
340 elements computed and summed
400 color gamut
410 gradient vectors
420 gradient paths
430 out-of-gamut target color
440 intersection point

The invention claimed is:

1. A method for adjusting a target color in a device independent color space wherein into a color gamut, the adjusting comprising moving the color along a gravitational potential gradient path to an intersection point where the path intersects the color gamut, wherein a simplified triangle mesh representation of the color gamut is used for gravitational potential gradient calculations and a fine triangle mesh representation of the color gamut is used for determining said intersection point.

2. The method of claim 1, wherein the simplified triangle mesh has at least one fewer triangle than the fine triangle mesh.

3. The method of claim 2, wherein the simplified mesh is created from the fine triangle mesh using quadric error-based surface simplification.

4. The method of claim 1, wherein the gravitational potential gradient calculation applies position-dependent weights to gravitational potential gradient components.

5. The method of claim 4, wherein the position-dependent weights are functions of lightness in the device independent color space.

6. The method of claim 4, wherein position-dependent weights are functions of chroma in the device independent color space.

7. The method of claim 4, wherein the position-dependent weights are functions of lightness, chroma, and hue in the device independent color space.

8. The method of claim 1, wherein determination of the intersection point using the fine triangle mesh includes intersection test using a space-partitioning data structure.

9. The method of claim 8, wherein the space-partitioning data structure is an octree.

* * * * *